(12) United States Patent
Dean et al.

(10) Patent No.: US 6,460,708 B2
(45) Date of Patent: Oct. 8, 2002

(54) BICYCLE CARRIER

(75) Inventors: Gregory A. Dean, McKinleyville; Scott R. Allen, Fieldbrook, both of CA (US)

(73) Assignee: Yakima Products, Inc., Arcata, CA (US)

(*) Notice: Subject to any disclaimer, the term of this patent is extended or adjusted under 35 U.S.C. 154(b) by 0 days.

(21) Appl. No.: 09/910,649

(22) Filed: Jul. 20, 2001

(65) Prior Publication Data

US 2001/0040139 A1 Nov. 15, 2001

Related U.S. Application Data

(62) Division of application No. 09/447,908, filed on Nov. 23, 1999, now Pat. No. 6,283,310.

(51) Int. Cl.[7] .................................................. B62H 5/00
(52) U.S. Cl. ............................. 211/20; 211/5; 211/17; 70/233; 70/315; 224/924; 403/320
(58) Field of Search ............................. 211/5, 17, 20; 70/19, 233, 315; 224/924; 403/320, 315, 324

(56) References Cited

U.S. PATENT DOCUMENTS

| 3,239,115 | A |   | 3/1966  | Bott et al.      |
|-----------|---|---|---------|------------------|
| 3,828,993 | A |   | 8/1974  | Carter           |
| 3,848,784 | A |   | 11/1974 | Shimano et al.   |
| 3,893,568 | A |   | 7/1975  | Lile             |
| 3,912,139 | A |   | 10/1975 | Bowman           |
| 4,028,915 | A |   | 6/1977  | Stahl            |
| 4,057,182 | A |   | 11/1977 | Kolkhorst et al. |
| 4,057,183 | A |   | 11/1977 | Ness             |
| 4,114,409 | A |   | 9/1978  | Scire            |
| 4,274,569 | A |   | 6/1981  | Winter et al.    |
| 4,400,038 | A | * | 8/1983  | Hosokawa         |
| 4,433,786 | A |   | 2/1984  | Wahl             |
| 4,442,961 | A |   | 4/1984  | Bott             |
| 4,469,257 | A |   | 9/1984  | Parker           |
| 4,473,176 | A |   | 9/1984  | Harper           |
| 4,621,873 | A |   | 11/1986 | Weinstein et al. |
| 4,629,104 | A |   | 12/1986 | Jacquet          |
| 4,702,401 | A |   | 10/1987 | Graber et al.    |
| 4,724,692 | A |   | 2/1988  | Turin et al.     |
| 4,842,148 | A |   | 6/1989  | Bowman           |
| 4,887,754 | A |   | 12/1989 | Boyer et al.     |
| 4,934,572 | A |   | 6/1990  | Bowman et al.    |
| 4,938,475 | A |   | 7/1990  | Sargeant et al.  |
| 4,964,287 | A |   | 10/1990 | Gaul             |
| 5,005,390 | A |   | 4/1991  | Giannini et al.  |
| 5,007,260 | A |   | 4/1991  | Sharp            |
| 5,007,568 | A |   | 4/1991  | Da Vault         |

(List continued on next page.)

FOREIGN PATENT DOCUMENTS

| DE | 3034750 A1 | 4/1982 |
| DE | 4208064 A1 | 5/1993 |
| IT | 1189908    | 2/1988 |
| IT | 1236808    | 4/1993 |

OTHER PUBLICATIONS

535xt Classic Fork Mount Instructions, Thule U.S.A., undated.

Primary Examiner—Robert W. Gibson, Jr.
(74) Attorney, Agent, or Firm—Kolisch Hartwell Dickinson McCormack & Heuser

(57) ABSTRACT

A rack for carrying a bicycle on a vehicle. The rack includes forward and rear crossbars extending across a top surface of the vehicle and a pair of tower bodies associated with each crossbar to secure the crossbars to the vehicle. A wheel mount is attached to a first one of the crossbars. The wheel mount is adapted to support a wheel of the bicycle with a lowest point on the wheel positioned over a range of positions relative to the crossbar including with the lowest point positioned off the wheel mount.

22 Claims, 9 Drawing Sheets

U.S. PATENT DOCUMENTS

| | | |
|---|---|---|
| 5,014,890 A | 5/1991 | Perry |
| 5,020,708 A | 6/1991 | Kalbach |
| 5,027,628 A | 7/1991 | De Rocher et al. |
| 5,037,019 A | 8/1991 | Sokn |
| 5,042,705 A | 8/1991 | Johansson |
| 5,052,605 A | 10/1991 | Johansson |
| 5,065,921 A | 11/1991 | Mobley |
| 5,092,504 A | 3/1992 | Hannes et al. |
| 5,118,125 A | 6/1992 | Plunkett |
| 5,127,564 A | 7/1992 | Romero |
| 5,169,044 A | 12/1992 | Englander |
| 5,226,341 A | 7/1993 | Shores |
| 5,232,134 A | 8/1993 | Allen |
| 5,265,897 A | 11/1993 | Stephens |
| 5,275,319 A | 1/1994 | Ruana |
| 5,291,763 A | 3/1994 | Cuisinot |
| 5,362,173 A | 11/1994 | Ng |
| 5,427,286 A | 6/1995 | Hagerty |
| 5,476,200 A | 12/1995 | Wong |
| 5,479,836 A | 1/1996 | Chang |
| 5,492,258 A | 2/1996 | Brunner |
| 5,511,894 A | 4/1996 | Ng |
| 5,516,020 A | 5/1996 | Lawler et al. |
| 5,526,971 A | 6/1996 | Despain |
| 5,560,498 A | 10/1996 | Porter |
| 5,560,666 A | 10/1996 | Vieira et al. |
| 5,579,972 A | 12/1996 | Despain |
| 5,582,044 A | 12/1996 | Bolich |
| 5,598,959 A | 2/1997 | Lorensen et al. |
| 5,611,472 A | 3/1997 | Miller |
| 5,699,684 A | 12/1997 | Sulin |
| 5,699,945 A | 12/1997 | Micklish |
| 5,738,258 A | 4/1998 | Farrow et al. |
| 5,749,694 A | 5/1998 | Ackerman et al. |
| 5,779,116 A | 7/1998 | Rosch et al. |
| 5,875,947 A | 3/1999 | Noel et al. |
| 6,167,735 B1 * | 1/2001 | Brown ............... 211/5 X |
| 6,202,458 B1 * | 3/2001 | Buchalter ............ 70/233 |
| 6,260,931 B1 * | 7/2001 | Stewart |
| 2002/0026816 A1 * | 3/2002 | Katsouros et al. ........ 70/233 |

* cited by examiner

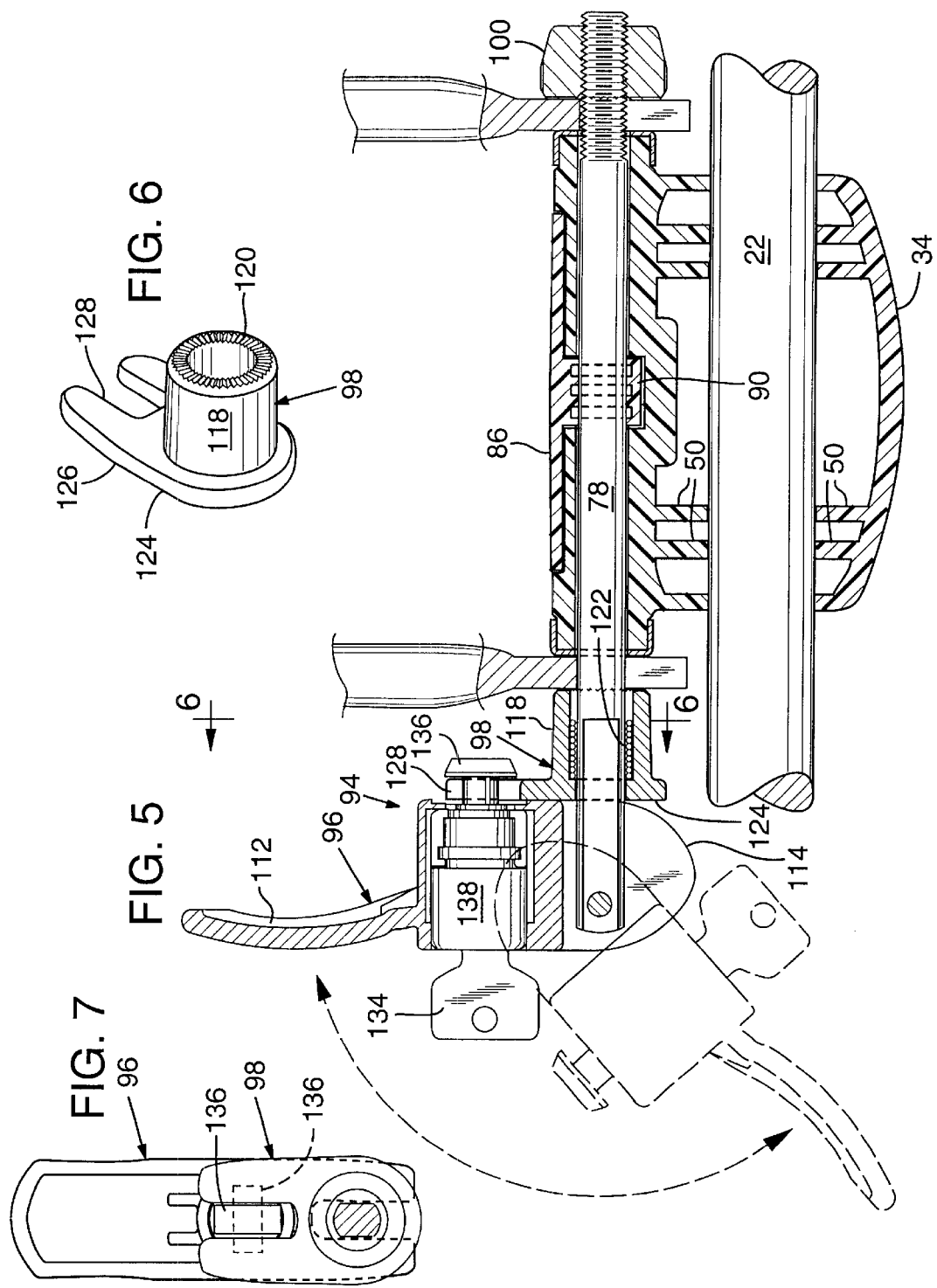

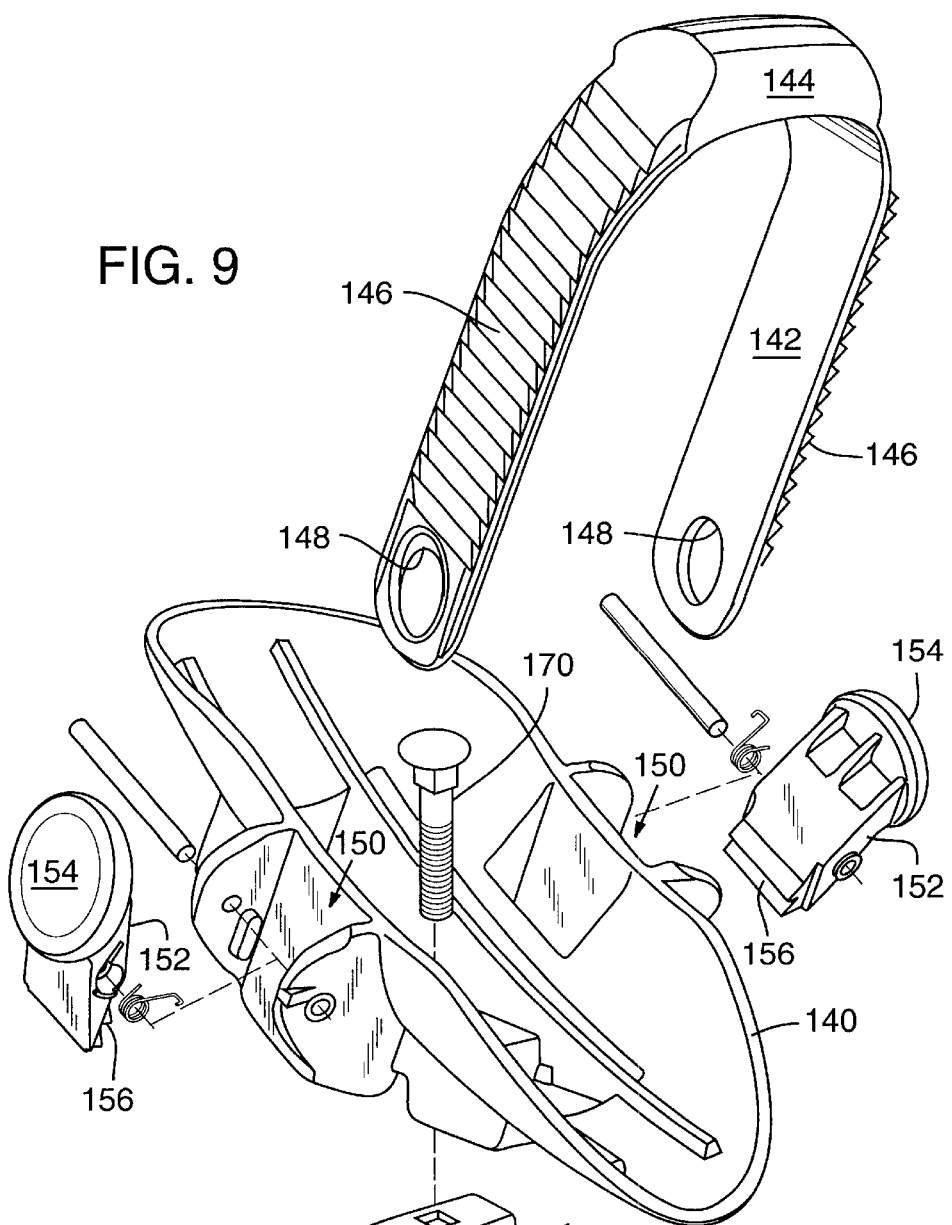
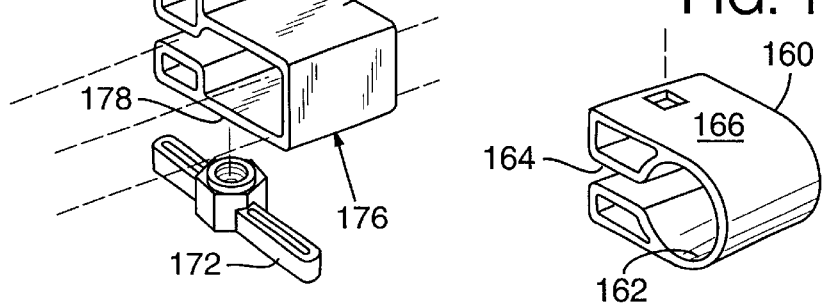

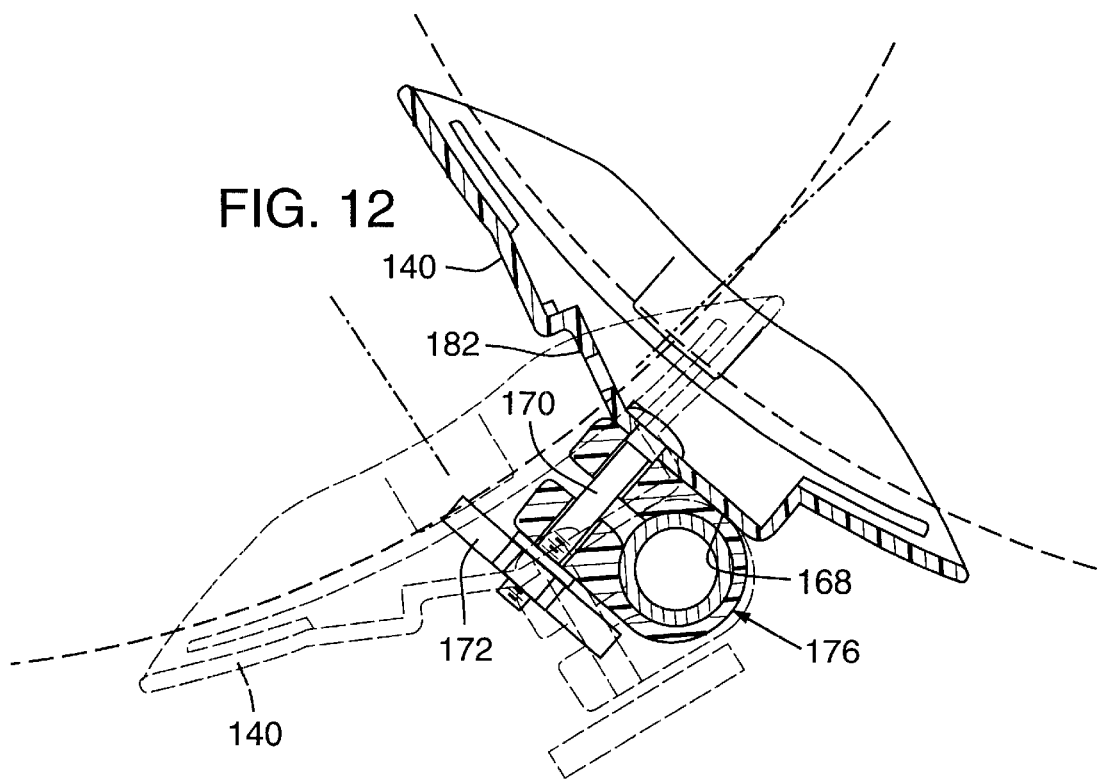
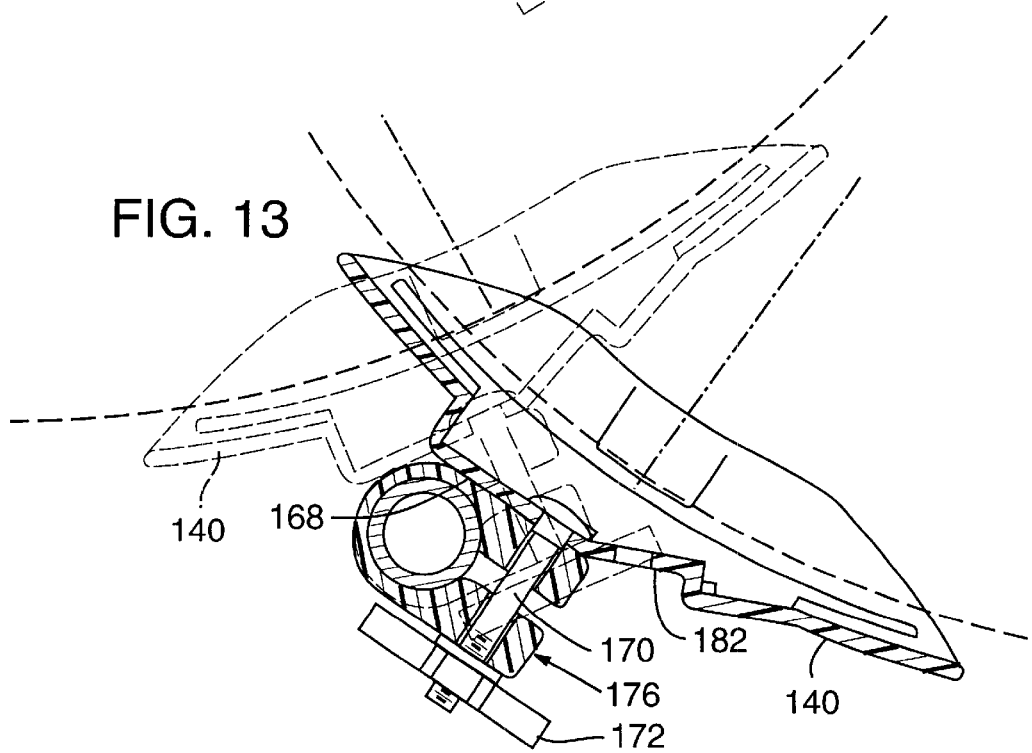

BICYCLE CARRIER

CROSS REFERENCE TO RELATED APPLICATION

This application is a divisional application of U.S. patent application Ser. No. 09/447,908 filed Nov. 23, 1999 now U.S. Pat. No. 6,283,310 titled "Bicycle Carrier" and is hereby incorporated by reference.

FIELD OF THE INVENTION

The present invention relates to bicycle carriers and more particularly to a fork block and wheel tray used to secure a bicycle on a roof rack.

BACKGROUND OF THE INVENTION

With the growing popularity of bicycling as a recreational activity, vehicles are often equipped with racks to transport bicycles. Such racks come in many different styles and configurations. One common configuration is a roof rack in which one or more bicycles are mounted to a pair of crossbars that extend across the top of the vehicle.

Various systems have been developed to secure and stabilize bicycles on vehicle-mounted cross arms. One such system utilizes a fork block mounted to one of the bars with a skewer extending therethrough to receive and grip the front forks of a bicycle. Typically, a wheel tray extends from the fork block to the other crossbar to receive the rear tire of the bicycle. In a slight variation, a short wheel tray is attached to only one crossbar to receive the rear wheel. One limitation of this variation is that the rear wheel must be substantially centered over the crossbar to avoid creating excess torque on the short wheel tray and/or crossbar. This limitation can be a problem where the crossbars cannot be positioned on the vehicle to accommodate the wheel base of a particular bicycle, or where it is desirable to carry bicycles with different wheel bases.

In addition to meeting the basic physical requirements of mounting a bicycle on a vehicle, it is also important for a rack to permit the bicycle to be locked on to prevent unauthorized removal. In systems utilizing fork blocks, this is usually accomplished by providing a lock associated with the skewer to prevent the skewer from being opened. Existing lock designs are either unnecessarily complex or not sufficiently secure.

BRIEF DESCRIPTION OF THE FIGURES

FIG. 4 is a perspective view of a lower surface of a cap forming part of the fork block of FIG. 2.

FIG. 5 is a sectional view through the fork block of FIG. 2.

FIG. 6 is a cam follower forming part of the fork block of FIG. 2.

FIG. 7 is a view of a lock portion of the fork block of FIG. 2.

FIG. 9 is an exploded perspective view of a wheel mount according to the present invention.

FIG. 11 is a perspective view of a clip according to the present invention.

FIGS. 12 and 13 illustrate various mounting positions for the wheel mount of FIG. 9 on a round crossbar.

DETAILED DESCRIPTION OF THE PREFERRED EMBODIMENT

Figure 1:
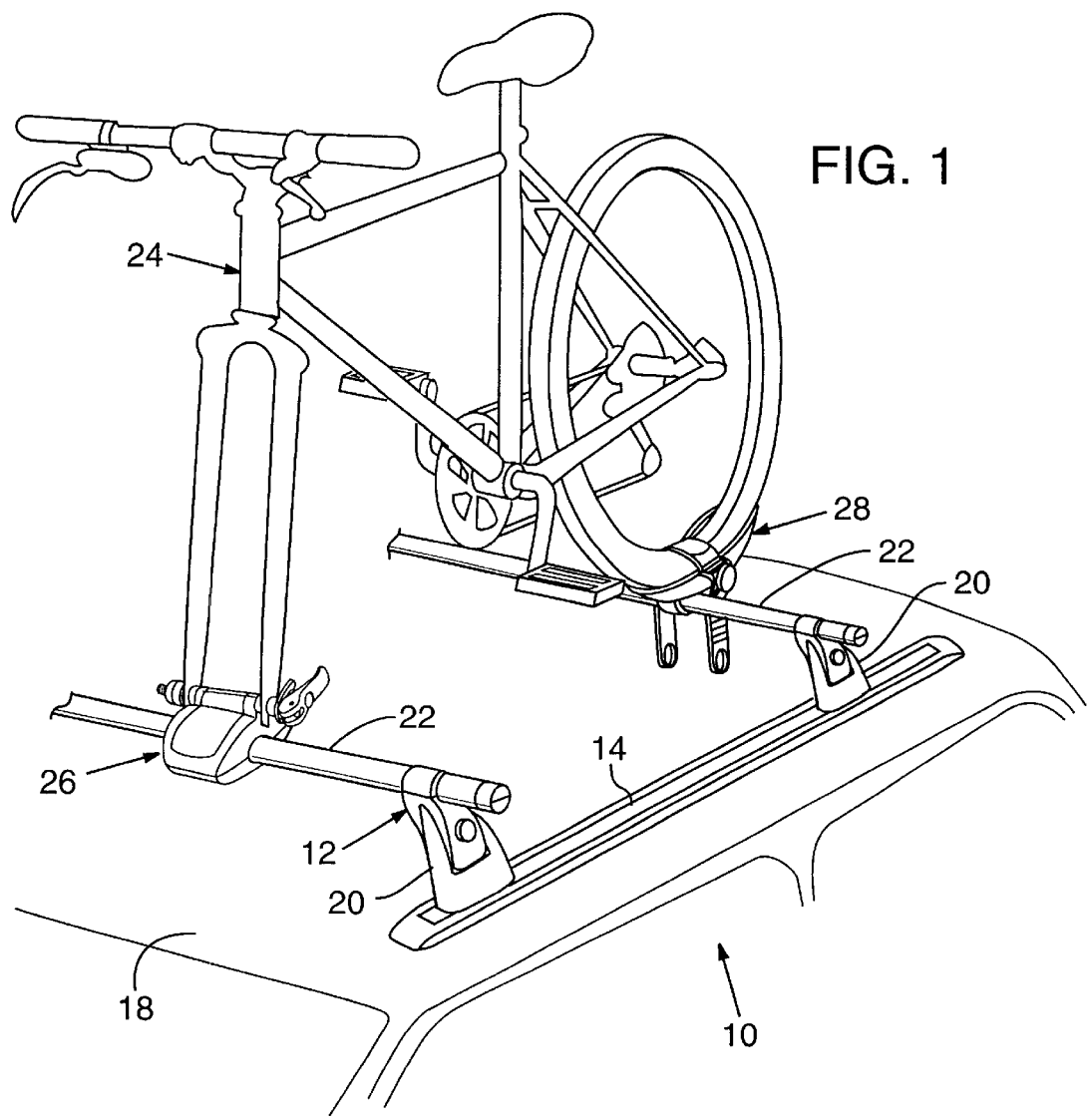
FIG. 1 is a perspective view of a bicycle roof rack according to the present invention.

A bicycle mounting system according to the present invention is shown generally at 10 in FIG. 1. System 10 includes a roof-mounted rack 12 that attaches to factory installed tracks 14 on a roof 16 of a vehicle 18. Rack 12 includes towers 20 that interconnect the tracks to crossbars 22. A bicycle 24 is secured to the crossbars by a fork block 26 and a wheel mount 28.

Figure 2:
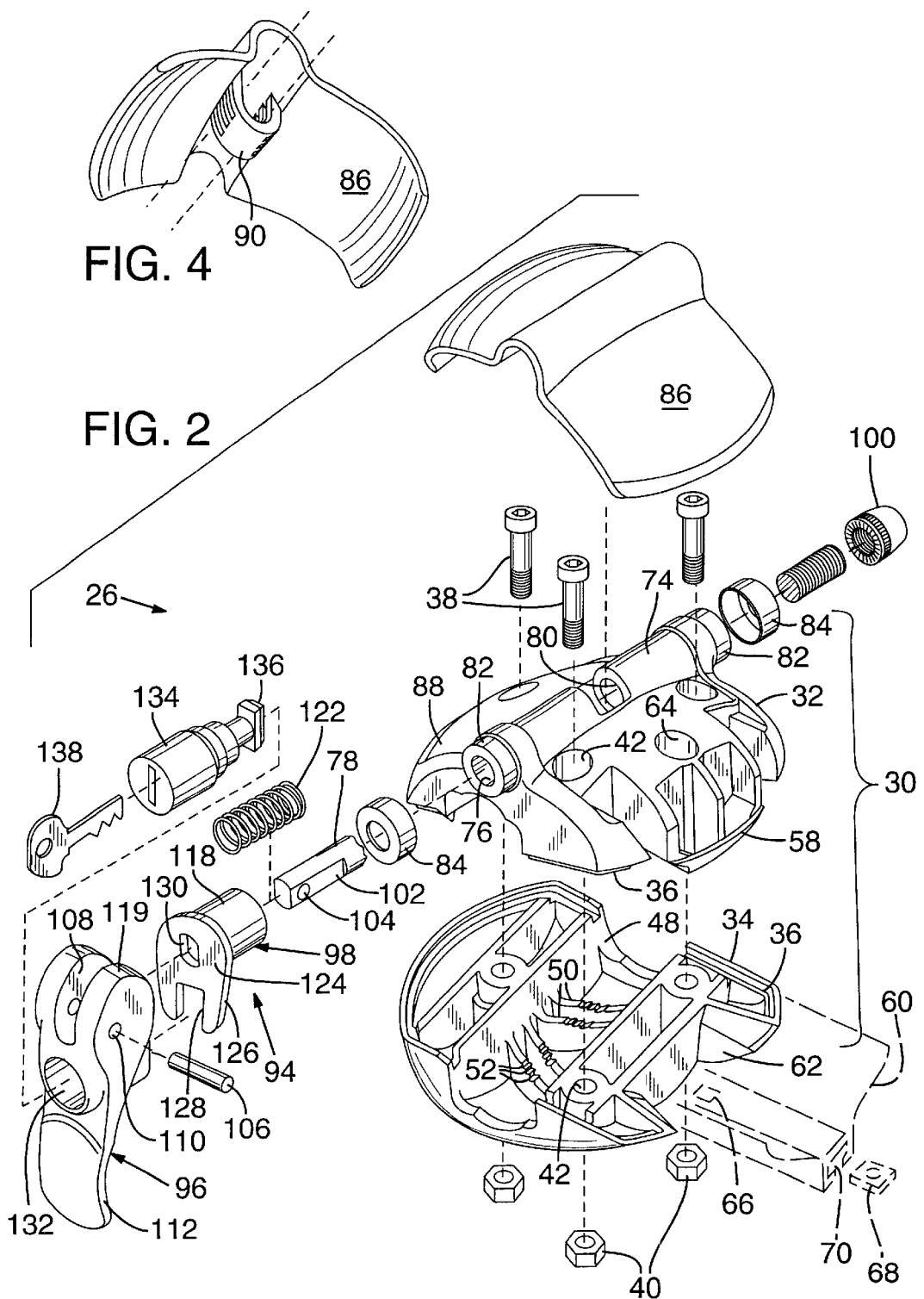
FIG. 2 is an exploded perspective view of a fork block according to the present invention.

The construction of fork block 26 is shown in FIGS. 2–7. As shown in FIG. 2, fork block 26 includes a molded plastic body 30 with an upper section 32 and a lower section 34. The facing perimeters of each section are formed with stepped edges 36 that interlock with each other. The two sections are secured together by three bolts 38 that engage three corresponding nuts 40. The bolts pass through holes 42 molded in each section. A socket 44 is formed at the bottom of each hole on the lower section to receive a nut. See FIG. 3. The inside end of the socket is hexagonally shaped in cross-section to prevent the nut from rotating once placed in the socket.

Figure 3:
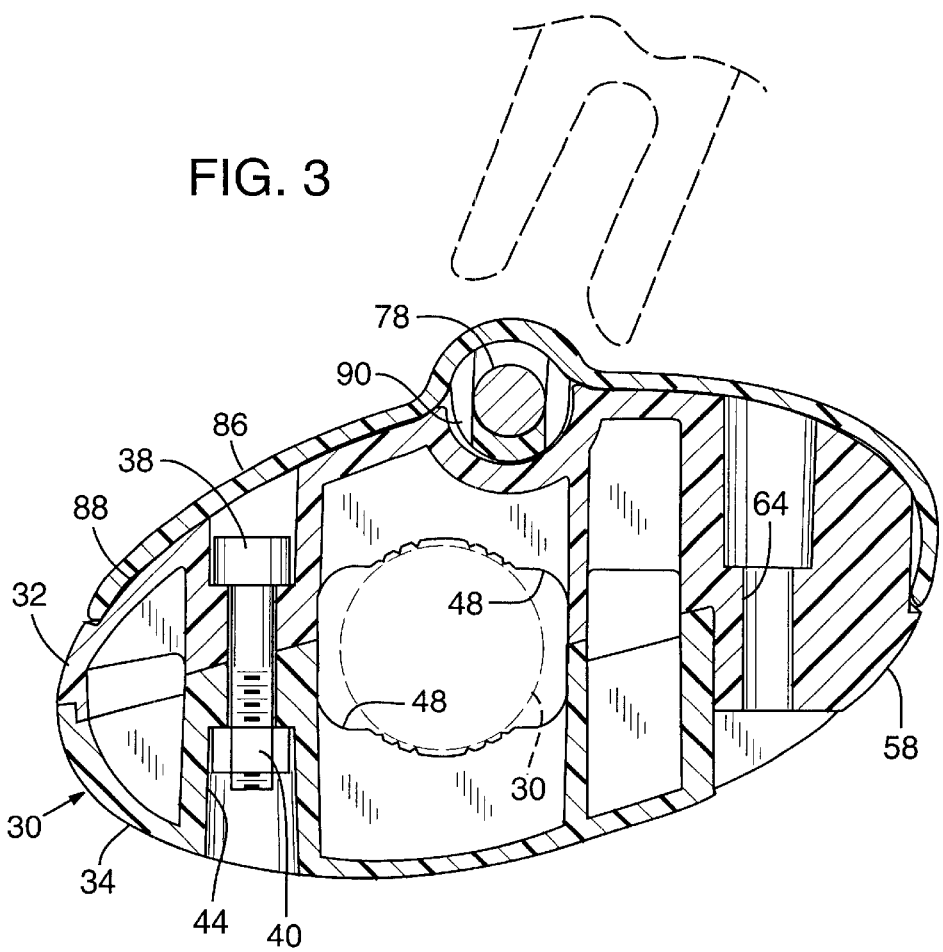
FIG. 3 is a sectional view through the fork block of FIG. 2.

Each section includes a channel 48 adapted to fit over a crossbar. The channel is shaped, as shown in FIG. 3, to allow installation on either round or rectangular bars, which are the two most common shapes. The channels are sized so that as the sections just come together, the channels grip the bar with sufficient pressure to prevent slippage along the length of the bar. A plurality of reinforcing ribs 50 run across the channels and are provided with teeth 52. The teeth bite into a pliable coating that is typically applied to the surface of round crossbars to stabilize the fork block against rotation about the bars. The teeth are generally unnecessary in the case of rectangular crossbars where the non-symmetric cross-section prevents rotation.

The upper section includes wheel tray receiver in the form of a protrusion 58 configured to receive the front end of an elongate wheel tray 60. A corresponding recess 62 is formed in the lower section. The wheel tray is secured to the protrusion by a screw that fits down through a hole 64 in the protrusion, through a hole 66 in the tray and into a flat nut 68 which rides in a track 70 formed in the bottom of the wheel tray. As will be described below, and as depicted in FIG. 1, the fork block can also be used with a short wheel tray rather than tray 60.

A ridge 74 runs across the top of the upper section with a bore 76 formed therethrough to receive a skewer 78. The ridge is formed with a gap 80 at the center and extensions 82 at each end. Metal bearing sleeves 84 are pressed over the extensions to provide a hard surface for the forks to press against. A security cover or cap 86 fits into a recess 88 formed in the top of the upper section. The cap includes a retainer 90 that fits into the gap in the ridge around the skewer to hold the cap on the upper section. See FIG. 4.

It should be noted that the cap blocks access to the heads of the bolts that secure the upper and lower sections together. As a result, the sections cannot be removed from the crossbar without removing the cap. Since the cap cannot be removed without removing the skewer, as long as the skewer cannot be removed, the fork block and bicycle carried thereon cannot be removed from the vehicle.

The skewer is part of a skewer assembly 94, shown in FIGS. 2 and 5, that also includes a cam lever 96, a cam follower 98 and an adjustment nut 100. The skewer By includes a flattened section 102 with a hole 104 near the end to receive a pivot pin 106 which pivotally connects the cam lever to the skewer. The cam lever includes a slot 108 that fits over the flattened section and allows the cam lever to rotate thereon. The pin is preferably press fit through a hole 110 formed in the sides of the cam lever on either side of the slot and through the skewer.

Figure 8:
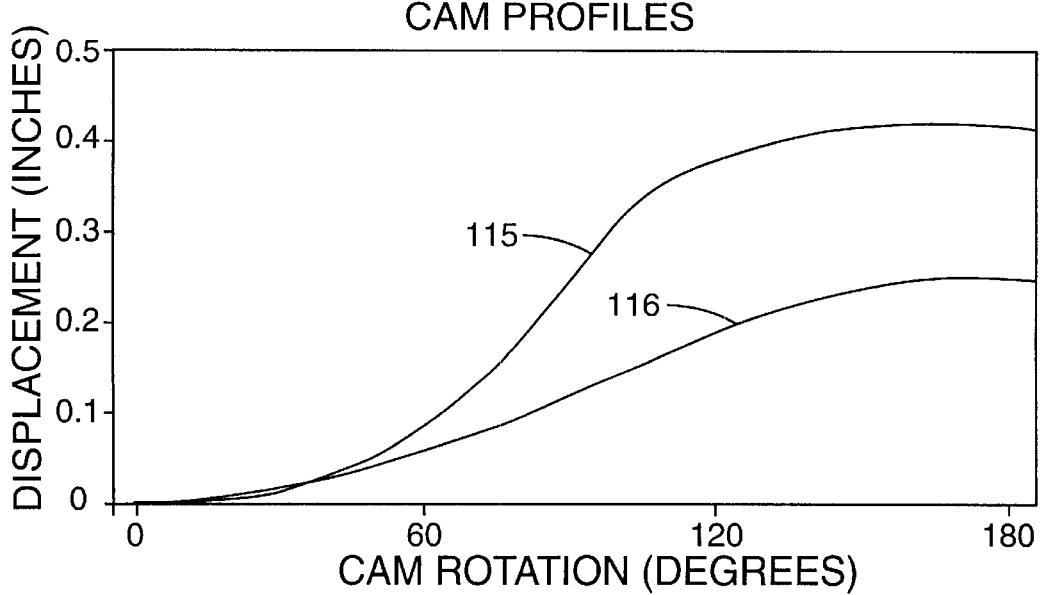
FIG. 8 is a graph of displacement as a function of rotation for various cam profiles.

The cam lever includes a handle portion 112 to allow a user to pivot the lever. As the lever pivots, a cam surface 114 that rides against the cam follower. The cam surface is shaped so that as the cam lever is pivoted, it pushes the cam follower toward the fork block. More particularly, the cam surface is shaped so that, as the lever is rotated from the open position to the closed, the cam follower is moved rapidly over the first two-thirds of rotation and then slower and with greater leverage as the closed position is approached. The shape of this profile is depicted at 115 in FIG. 8. The adjustment nut is positioned on the skewer to adjust as necessary for different fork thickness.

The described cam surface profile provides rapid throw with low force during the first part of closing where the forks have not been contacted and high force at the end to clamp the forks. As a result, it is not necessary to loosen the nut to allow the forks to be removed, even when the forks are equipped with knobs to prevent accidental wheel loss. This is in contrast to the standard eccentric circle cams utilized on prior skewers. An eccentric circle has a throw rate as a function of rotation that starts small, reaches a maximum rate of change at 90-degrees, and decreases again until the closed position is reached. See the curve indicated at 116 in FIG. 8. It can be seen that curve 115 has the same slope, and therefore clamping force as a function of rotation during the final section of operation, but has a much higher slope where no pressure is required. With an offset circular cam, the overall throw cannot be increased without increasing the slope in the clamping region and thus decreasing the available clamping leverage. By way of comparison, the skewer clamp of the present invention provides more than three-eighths of an inch of throw versus the five-sixteenths or less typically found in circular cam if devices. This increased throw comes without a corresponding reduction in holding force because of the shape of the cam surface. Although the size of a circular cam can be increased to achieve a desired throw, the resultant device would have less clamping force for a given torque on the cam than the system of the present invention. This reduced force may prevent adequate grip on the bicycle forks or may make the force required to close the cam unacceptably high.

The cam follower has an elongate hollow cylindrical body 118 that fits over the skewer. The body includes a serrated end 120 disposed toward the fork block to improve the grip on the bicycle fork. See FIG. 6. A spring 122 is disposed inside the cylindrical body to bias the cam follower against the cam lever. A smooth cam bearing plate 124 is formed on the opposite end of the plate for the cam surface to slide against. The bearing plate includes a lateral extension 126 with a slot 128 formed therein. The flattened end of the skewer passes through a correspondingly-shaped hole 130 in the bearing plate to prevent the follower from rotating on the skewer.

The cam lever further includes a lock-receiving bore 132 that is configured to receive a lock cylinder 134. The lock cylinder snaps into the lock-receiving bore and includes a T-shaped catch 136 that projects out of the cam lever to selectively engage slot 128 in the cam follower. In particular, with the catch oriented parallel to the slot, the cam lever can be moved freely between the open and closed positions. The open position is depicted by the dashed lines in FIG. 5. However, if the catch is rotated 90-degrees in the slot, as shown by the dashed lines in FIG. 7, the lever can no longer be rotated to release the skewer assembly. A key 138 is inserted into the lock cylinder to rotate the catch.

Figure 10:
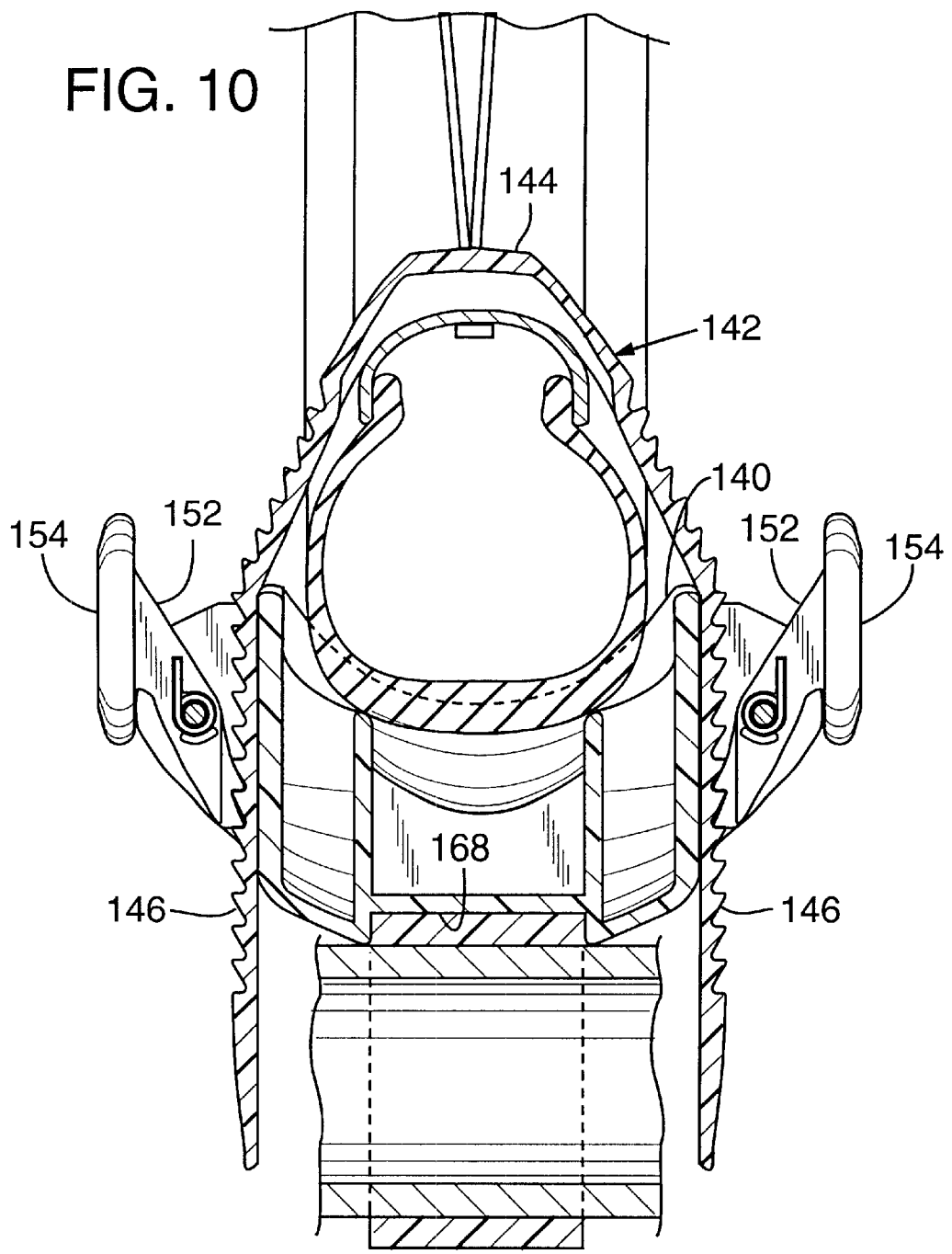
FIG. 10 is a sectional view of the wheel mount of FIG. 9.

As depicted in FIG. 1 and described above, the rear tire can be held to the crossbar by a long wheel tray or wheel mount 28. Wheel mount 28 is shown in detail in FIGS. 9–10 and includes a wheel tray portion 140. The wheel tray portion is cupped along the elongate axis to support a standard sized wheel at two circumferentially spaced points around the perimeter of the wheel. This arrangement eliminates the problem of the wheel tray "rocking" on a single tangent point on the surface of the wheel, as occurs with straight wheel trays.

The wheel tray portion is also cupped in the direction transverse to the elongate axis to stabilize the wheel against lateral movement. The wheel is held in the tray portion by a ratchet strap 142. Ratchet strap 142 is molded as a single piece and includes a central bridge portion 144, two toothed regions 146 and grip holes 148 at each end. The ends of the ratchet strap are inserted through receivers 150 formed on each side of the wheel tray portion. A spring-biased pawl 152 is associated with each receiver and includes a circular pad 154 to allow a user to pivot the pawl. Teeth 156 formed on the pawl allow the strap to be inserted, but prevent withdrawal unless the pawl is pivoted to disengage the teeth by pressing on the circular pad. When the ends of the strap are inserted and pulled tight, the bridge portion pushes down on the bicycle wheel to hold it against the wheel tray portion.

The wheel tray portion is held to a round crossbar by a clip 160, such as shown in FIG. 11. Clip 160 includes a recess 162 sized and shaped to closely fit over a round crossbar. A split 164 allows the ends of the clip to be spread apart to install the clip on the crossbar. The top surface 166 of the clip fits against a flat mounting surface 168 formed on the bottom of the wheel tray portion. A bolt 170 fits down through the wheel tray portion and the clip and is engaged by a T-nut 172. As the T-nut is tightened, the split is pressed together and the crossbar is firmly gripped.

As shown in FIGS. 12 and 13, the wheel tray portion can be mounted to the crossbar with either the bolt in front or behind the bar. Furthermore, the mount can be rotated around the bar. The ability to rotate around the bar and position the mount slightly in front of or behind the crossbar allows the mount to accommodate bicycles with wide range of wheel bases. The longitudinal cupping of the wheel tray portion around the perimeter of the tire reduces the tendency of the wheel tray to rock on the perimeter of the wheel. This combination of rotational flexibility and stability on the tire transfers torque created when the center of the wheel is placed significantly in front of or behind the cross-arm to the frame of the bicycle instead of causing the mount to rotate around the crossbar.

Figure 14:
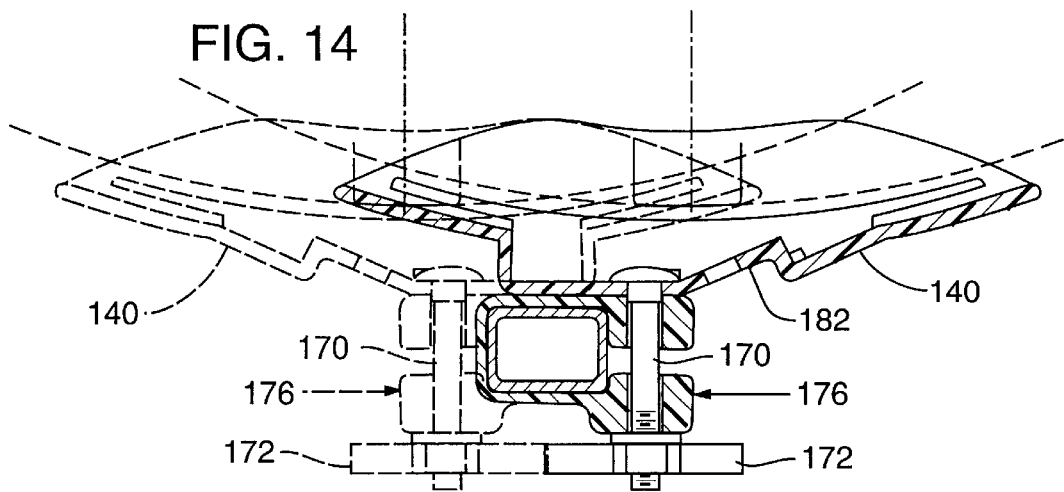
FIGS. 14 and 15 illustrate various mounting positions for the wheel mount of FIG. 9 on a rectangular crossbar.
Figure 15:
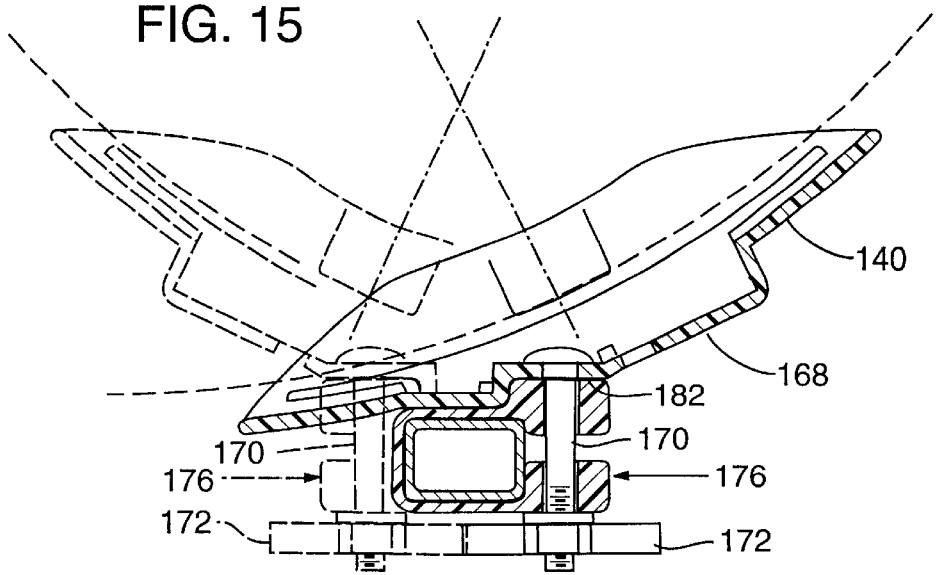

The mount can also be used with a rectangular cross-section crossbar by utilizing a rectangular clip 176, as shown in FIG. 9. Clip 176 is constructed similarly to clip 160, but includes a recess that is rectangular in cross-section rather than circular. Clip 176 includes a flat side 178 and a stepped side 180. The flat side is mounted to the wheel tray portion as previously described for the round clip and can be mounted in front of or behind the crossbar to accommodate variations in wheel base. See FIGS. 14 and 15. However, because of the irregular cross-sectional profile, it is not possible to rotate the clip around the bar.

In order to provide increased range of wheel base accommodation on a rectangular bar, an angled mounting surface 182 is formed on the bottom of the wheel tray portion. The angled mounting surface inclines the wheel tray portion relative to the cross-arm. This simulates in a discrete fashion the effect of rotation in the case of a round bar. As before, the mount can be attached to the crossbar with the wheel tray facing forward or backward.

Figure 16:
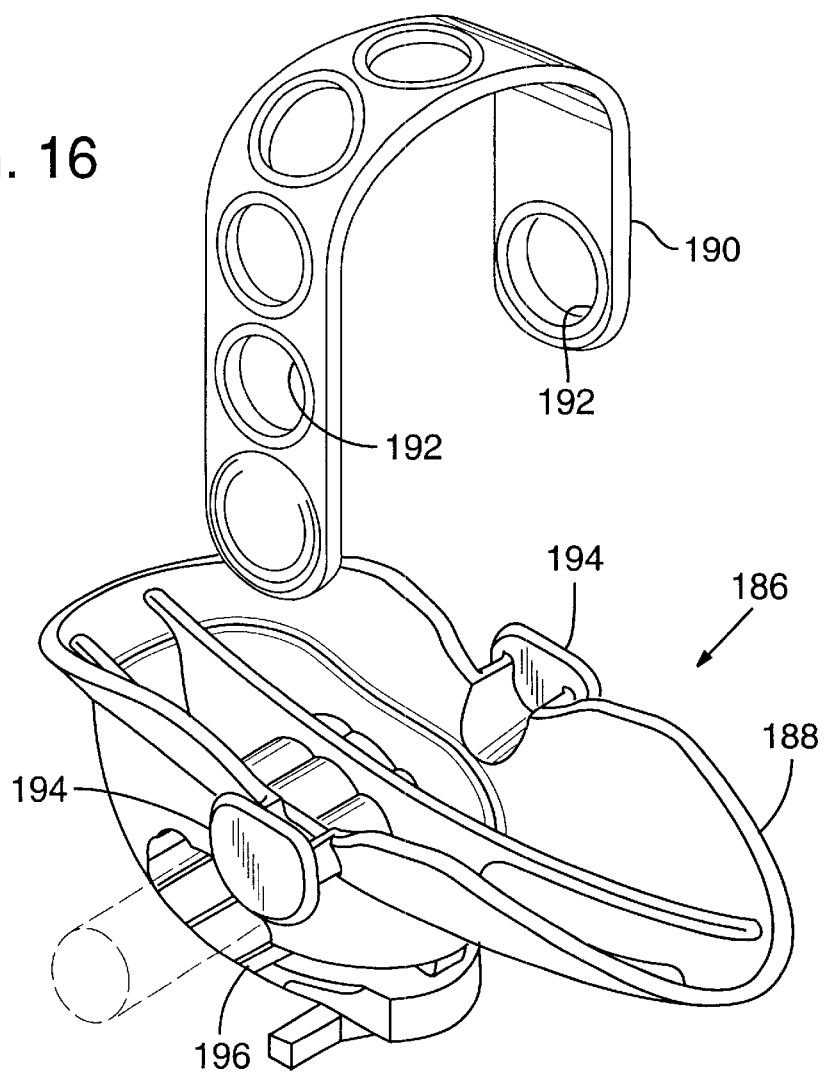
FIG. 16 is a perspective view of an alternative wheel mount according to the present invention.
Figure 17:
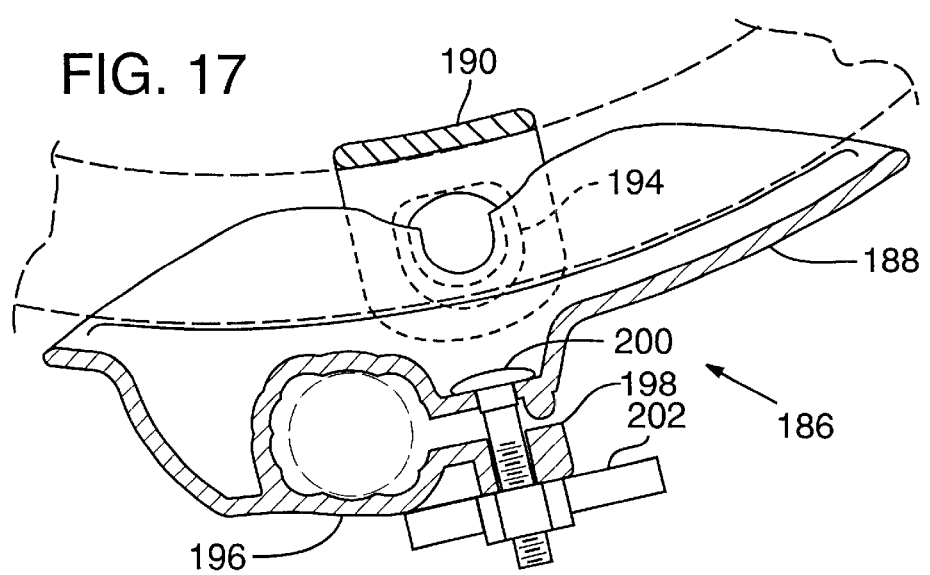
FIG. 17 is a side-sectional view of the wheel mount of FIG. 16.

FIGS. 16 and 17 depict a wheel mount 186 having a monolithic construction. Mount 186 includes a wheel tray portion 188 with a construction similar to wheel tray portion 140. The bicycle wheel is secured in the wheel tray portion by an elastic band 190 with a plurality of holes 192 that is stretched between mounting studs 194 formed on each side of the wheel tray portion. The mount is secured to the bar by a clip 196 formed integrally with the bottom of the wheel tray portion. A slot 198 is formed at one side of the clip to allow it to open up to be installed over a crossbar. A bolt 200 and T-nut 202 are used to tighten the clip on the bar. It should be noted that the cross section of the opening in the clip is sculpted to allow it to be installed on either a round bar or a rectangular bar. In addition, the sculpting allows the mount to be positioned on the rectangular bar at a number of different rotational positions.

The above-described arrangements for attaching the mount to the crossbar allows the mount to accommodate wheel base variations of plus or minus 9 inches on round bars and plus or minus 6 inches on square bars. Thus, a bicycle with a wheel base of 32 inches could be mounted together with a bicycle with a 50 inch wheel base on a rack with crossbars spaced at 41 inches. Alternatively, this arrangement allows the position of the crossbars to be adjusted over a wide range of positions when mounting a bicycle of a fixed wheel base. For instance, an average mountain bike has a wheel base of 40–42 inches and can be mounted on bars spaced from 32 to 50 inches. This flexibility allows the rack to be used on a wide range of vehicle styles. With prior systems, the mounting flexibility of the short wheel mount was not possible without using a long-style wheel tray.

While the invention has been disclosed in its preferred form, the specific embodiments thereof as disclosed and illustrated herein are not to be considered in a limiting sense as numerous variations are possible. Applicants regard the subject matter of the invention to include all novel and non-obvious combinations and subcombinations of the various elements, features, functions and/or properties disclosed herein. No single feature, function, element or property of the disclosed embodiments is essential to all embodiments of the invention. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are different, broader, narrower or equal in scope to the original claims, are also regarded as included within the subject matter of applicants' invention.

We claim:

1. A fork block for securing the forks of a bicycle, comprising:
   a body;
   an elongate skewer mounted to the body;
   a cam follower slidably mounted on the skewer; and
   a cam lever pivotally mounted on the skewer adjacent the cam follower and operable upon rotation to reciprocally shift the cam follower on the skewer, where the cam lever further carries a lock to selectively secure the cam lever to the cam follower.

2. The fork block of claim 1, wherein the fork block is configured to be selectively secured to a vehicle-mounted crossbar.

3. The fork block of claim 2, wherein the skewer must be at least partially removed from the body to remove the body from the crossbar.

4. The fork block of claim 2, wherein the body includes two portions that are held together by screws, and wherein the body further includes a cap that is selectively fit over at least part of one of the portions to block access to the screws when the cap is in place.

5. The fork block of claim 4, wherein the cap is held in place by the skewer.

6. The fork block of claim 1, wherein the cam lever includes a non-circular cam surface profile.

7. The fork block of claim 1, wherein the fork block includes a wheel tray receiver adapted to selectively receive and secure an end of an elongate wheel tray.

8. A fork block for securing the forks of a bicycle, comprising:
   a skewer
   a body configured to be mounted to a vehicle and hold the skewer in a fixed position relative to the vehicle, where the body includes at least one fastener to selectively secure the body to the vehicle; and
   a security cover configured to prevent removal of the fastener and held to the body by the skewer.

9. The fork block of claim 8, wherein the fastener includes at least one bolt.

10. The fork block of claim 8, wherein the security has an internal hook structure for engaging the skewer so that security cover cannot be removed without at least partially removing the skewer from the body.

11. The fork block of claim 8 further comprising
    a cam lever connected to the end of the skewer, the lever being movable between tightened position and an untightened position for clamping and unclamping a bike fork.

12. The fork block of claim 11, wherein the cam lever has a lock device that selectively secures the cam lever in a tightened position and that simultaneously secure the security cover over the fastener.

13. A fork block for securing a bicycle fork to a rack comprising
    a body and a fastening device for securing the body to a cross bar,
    an elongate skewer mounted to the body,
    a cam lever connected to an end of the skewer, the lever being movable between a tightened position and an untightened position for clamping and unclamping a bike fork,
    a lock device that selectively secures the cam lever in a tightened position and that secures a cover over the fastening device.

14. The fork block of claim 13 further comprising a cam follower slidably mounted on the skewer.

15. The fork block of claim 14, wherein the cam follower has a serrated surface for gripping a wheel fork.

16. The fork block of claim 14, wherein the cam follower has extension members for engaging the lock device.

17. A fork block for securing a bicycle fork to a rack comprising a body and a fastening device for securing the body to a cross bar, an elongate skewer mounted to the body, the skewer having a flattened end portion, a cam follower having a non-circular hole for receiving the end portion of the skewer, the cam follower also having extension members, and a cam lever connected to an end of the skewer, the cam lever having a lock device for engaging extension members when the cam lever is in a clamping position.

18. The fork block of claim 17, wherein the fastening device includes at least one bolt.

19. The fork block of claim 17 further comprising a security cover for covering the fastening device.

20. The fork block of claim 19, wherein the cover has an internal hook structure configured to mount on the skewer.

21. The fork block of claim 17, wherein the cam follower has a serrated surface for gripping a wheel fork.

22. The fork block of claim 19, wherein the locked device secures the security cover and simultaneously maintains the cam lever in the clamping position.

\* \* \* \* \*